US012656147B2

(12) United States Patent     (10) Patent No.:   US 12,656,147 B2

Tang et al.     (45) Date of Patent:     Jun. 16, 2026

(54) STEP COUNTING METHOD, STEP COUNTING DEVICE, AND COMPUTER READABLE STORAGE MEDIUM

(71) Applicant: GOERTEK INC., Weifang (CN)

(72) Inventors: Yanhua Tang, Weifang (CN);
         Mingming Wang, Weifang (CN)

(73) Assignee: GOERTEK INC., Weifang (CN)

( * ) Notice:   Subject to any disclaimer, the term of this patent is extended or adjusted under 35 U.S.C. 154(b) by 229 days.

(21) Appl. No.: 18/018,617

(22) PCT Filed: Oct. 31, 2020

(86) PCT No.: PCT/CN2020/125637
     § 371 (c)(1),
     (2) Date: Jan. 30, 2023

(87) PCT Pub. No.: WO2022/021650
     PCT Pub. Date: Feb. 3, 2022

(65) Prior Publication Data
     US 2023/0349721 A1     Nov. 2, 2023

(30) Foreign Application Priority Data
     Jul. 30, 2020   (CN) .......................... 202010757461.9

(51) Int. Cl.
     *G01C 22/00*      (2006.01)
(52) U.S. Cl.
     CPC ................................. *G01C 22/006* (2013.01)
(58) Field of Classification Search
     CPC ................................................. G01C 22/006
     See application file for complete search history.

(56) References Cited

U.S. PATENT DOCUMENTS

| | | | | |
|---|---|---|---|---|
| 10,539,429 B1 * | 1/2020 | Romrell | ................ | A61B 5/1118 |
| 10,579,037 B1 * | 3/2020 | Zhang | .................. | G05B 19/406 |
| 10,732,006 B1 * | 8/2020 | Romrell | ................ | A61B 5/112 |

(Continued)

FOREIGN PATENT DOCUMENTS

| | | |
|---|---|---|
| CN | 102297701 A | 12/2011 |
| CN | 102954803 A | 3/2013 |

(Continued)

OTHER PUBLICATIONS

International Search Report from International Application No. PCT/CN2020/125637 mailed Apr. 27, 2021.

*Primary Examiner* — Yoshihisa Ishizuka

(74) *Attorney, Agent, or Firm* — Shih IP Law Group, PLLC.

(57)         ABSTRACT

Disclosed are a step counting method, a step counting device, and a computer readable storage medium. The step counting method includes: obtaining acceleration data, the acceleration data including effective peaks (S100); determining a time interval between a current effective peak and an effective peak obtained last time; when the time interval is greater than a preset interval, obtaining a data area of the effective peaks until a next time interval is greater than the preset interval; when the number of effective peaks within the data area is less than a preset value, determining feature information of the effective peaks within the data area; and when the feature information of the effective peaks within the data area satisfies a preset condition, updating step counting data.

8 Claims, 7 Drawing Sheets

(56)         References Cited

U.S. PATENT DOCUMENTS

| | | | |
|---|---|---|---|
| 2007/0143069 | A1 | 6/2007 | Pasolini et al. |
| 2015/0185044 | A1* | 7/2015 | Nie ..................... G01C 22/006 |
| | | | 702/160 |
| 2016/0089080 | A1* | 3/2016 | Li ........................ A61B 5/1123 |
| | | | 702/141 |
| 2019/0113364 | A1* | 4/2019 | Khedr ................... G01C 19/00 |
| 2020/0202117 | A1* | 6/2020 | Wu ........................ G06F 21/32 |

FOREIGN PATENT DOCUMENTS

| | | | |
|---|---|---|---|
| CN | 103712632 | A | 4/2014 |
| CN | 104406604 | A | 3/2015 |
| CN | 105004349 | A | 10/2015 |
| CN | 105806359 | A | 7/2016 |
| CN | 107421560 | A | 12/2017 |
| CN | 108981745 | A | 12/2018 |
| CN | 110674801 | A | 1/2020 |
| CN | 111765900 | A | 10/2020 |
| EP | 1770369 | A1 | 4/2007 |

* cited by examiner

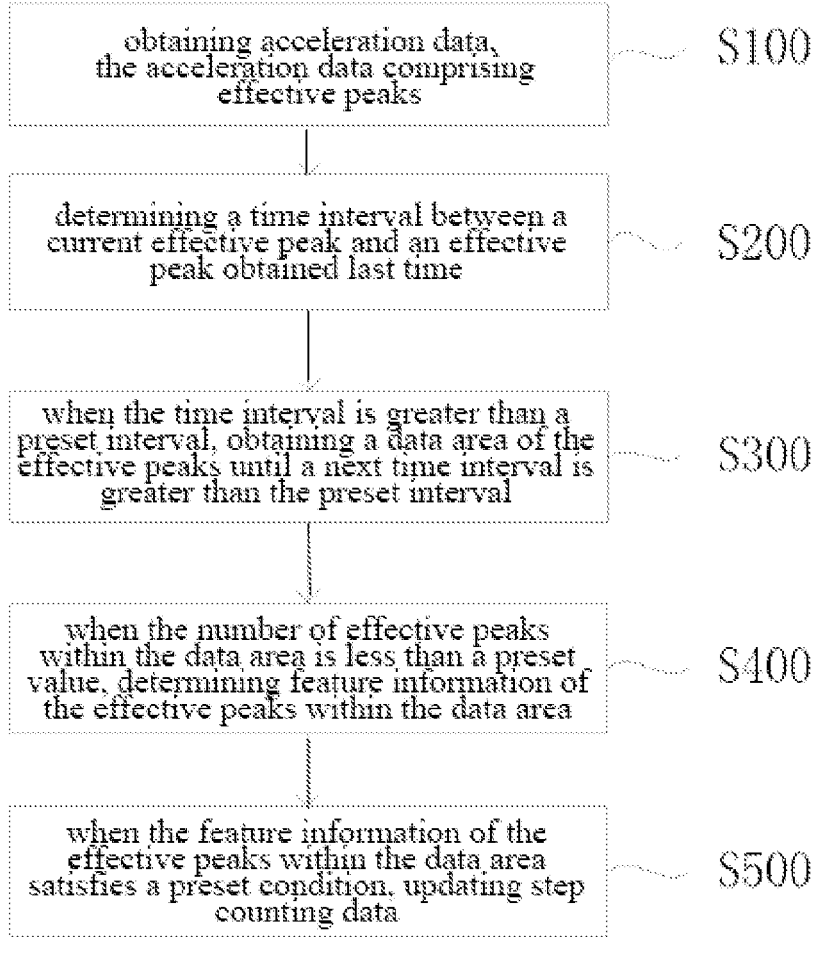

obtaining acceleration data,
the acceleration data comprising
effective peaks
— S100 determining a time interval between a
current effective peak and an effective
peak obtained last time
— S200 when the time interval is greater than a
preset interval, obtaining a data area of the
effective peaks until a next time interval is
greater than the preset interval
— S300 when the number of effective peaks
within the data area is less than a preset
value, determining feature information of
the effective peaks within the data area
— S400 when the feature information of the
effective peaks within the data area
satisfies a preset condition, updating step
counting data
— S500

Fig. 2

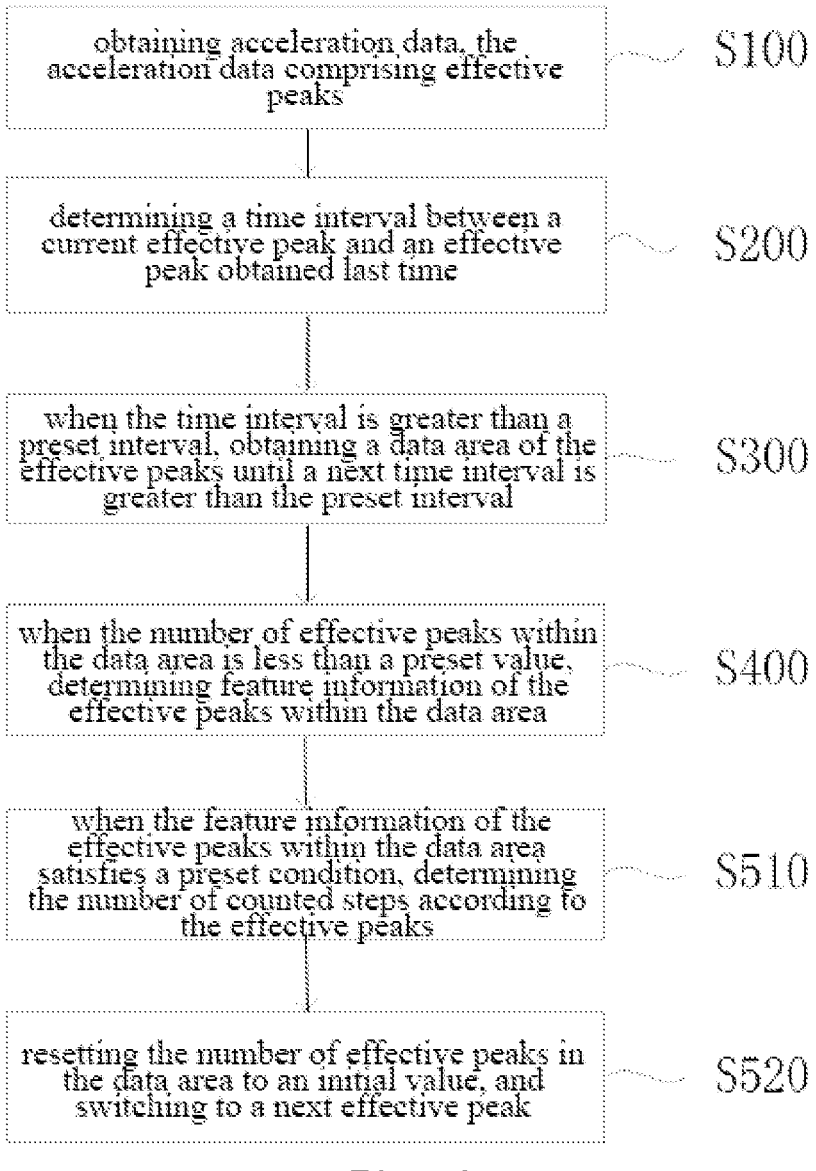

obtaining acceleration data, the acceleration data comprising effective peaks — S100 determining a time interval between a current effective peak and an effective peak obtained last time — S200 when the time interval is greater than a preset interval, obtaining a data area of the effective peaks until a next time interval is greater than the preset interval — S300 when the number of effective peaks within the data area is less than a preset value, determining feature information of the effective peaks within the data area — S400 when the feature information of the effective peaks within the data area satisfies a preset condition, determining the number of counted steps according to the effective peaks — S510 resetting the number of effective peaks in the data area to an initial value, and switching to a next effective peak — S520

Fig. 4

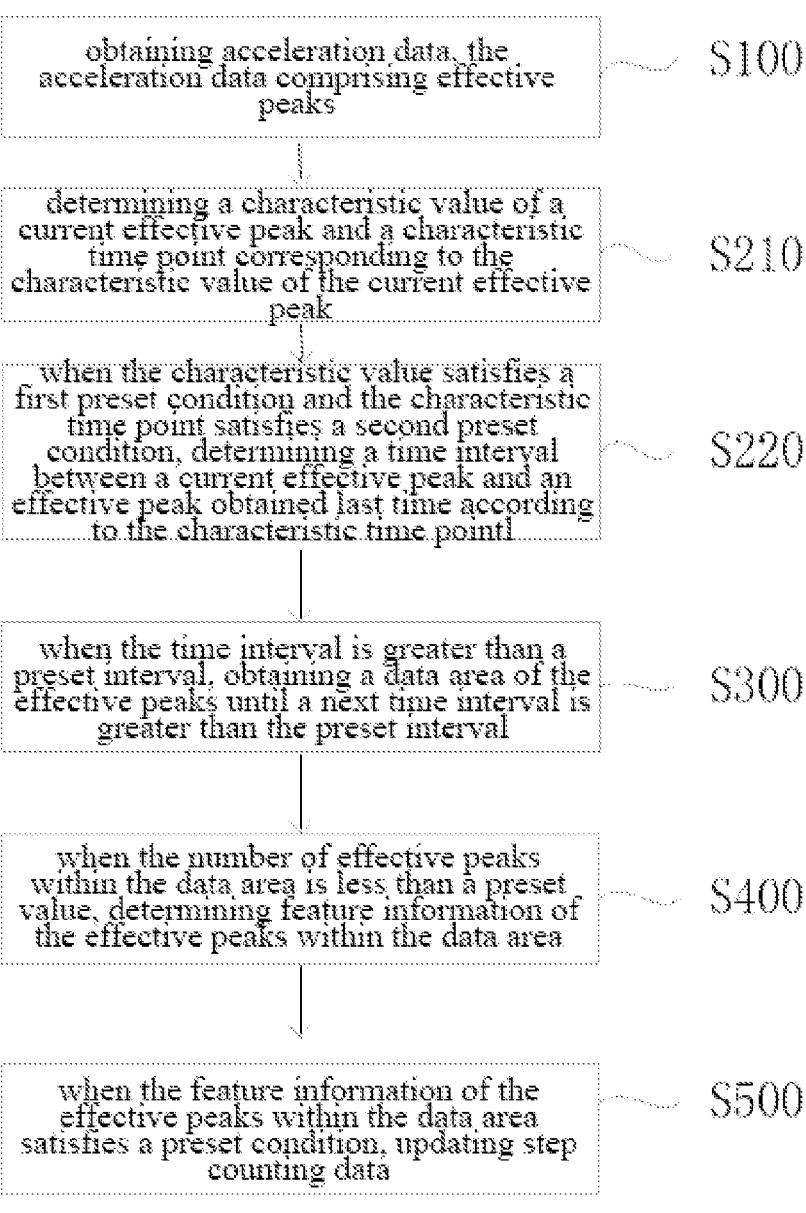

obtaining acceleration data, the acceleration data comprising effective peaks ~ S100 determining a characteristic value of a current effective peak and a characteristic time point corresponding to the characteristic value of the current effective peak ~ S210 when the characteristic value satisfies a first preset condition and the characteristic time point satisfies a second preset condition, determining a time interval between a current effective peak and an effective peak obtained last time according to the characteristic time point1 ~ S220 when the time interval is greater than a preset interval, obtaining a data area of the effective peaks until a next time interval is greater than the preset interval ~ S300 when the number of effective peaks within the data area is less than a preset value, determining feature information of the effective peaks within the data area ~ S400 when the feature information of the effective peaks within the data area satisfies a preset condition, updating step counting data ~ S500

Fig. 5

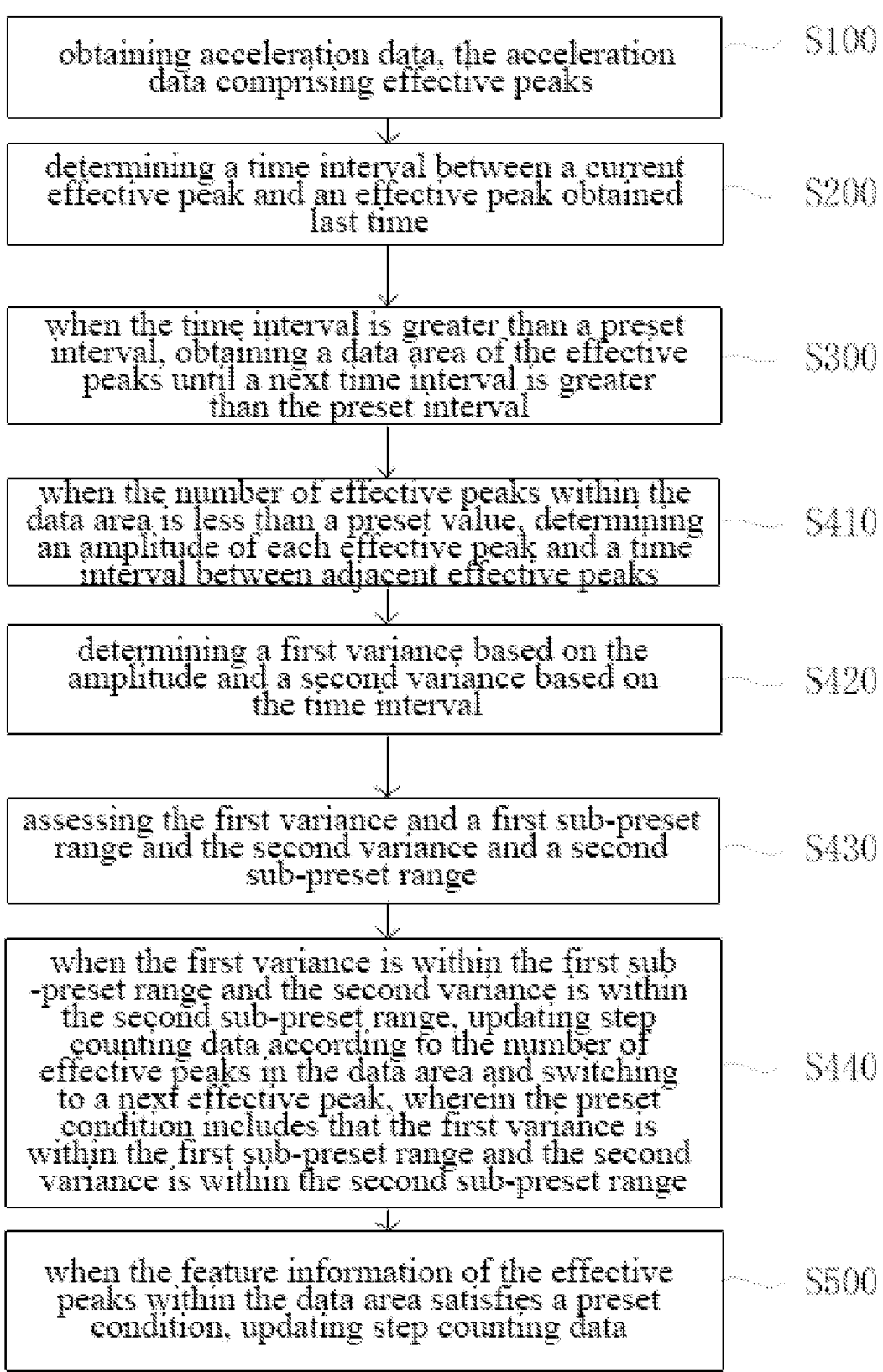

obtaining acceleration data, the acceleration data comprising effective peaks — S100 determining a time interval between a current effective peak and an effective peak obtained last time — S200 when the time interval is greater than a preset interval, obtaining a data area of the effective peaks until a next time interval is greater than the preset interval — S300 when the number of effective peaks within the data area is less than a preset value, determining an amplitude of each effective peak and a time interval between adjacent effective peaks — S410 determining a first variance based on the amplitude and a second variance based on the time interval — S420 assessing the first variance and a first sub-preset range and the second variance and a second sub-preset range — S430 when the first variance is within the first sub-preset range and the second variance is within the second sub-preset range, updating step counting data according to the number of effective peaks in the data area and switching to a next effective peak, wherein the preset condition includes that the first variance is within the first sub-preset range and the second variance is within the second sub-preset range — S440 when the feature information of the effective peaks within the data area satisfies a preset condition, updating step counting data — S500

Fig. 6

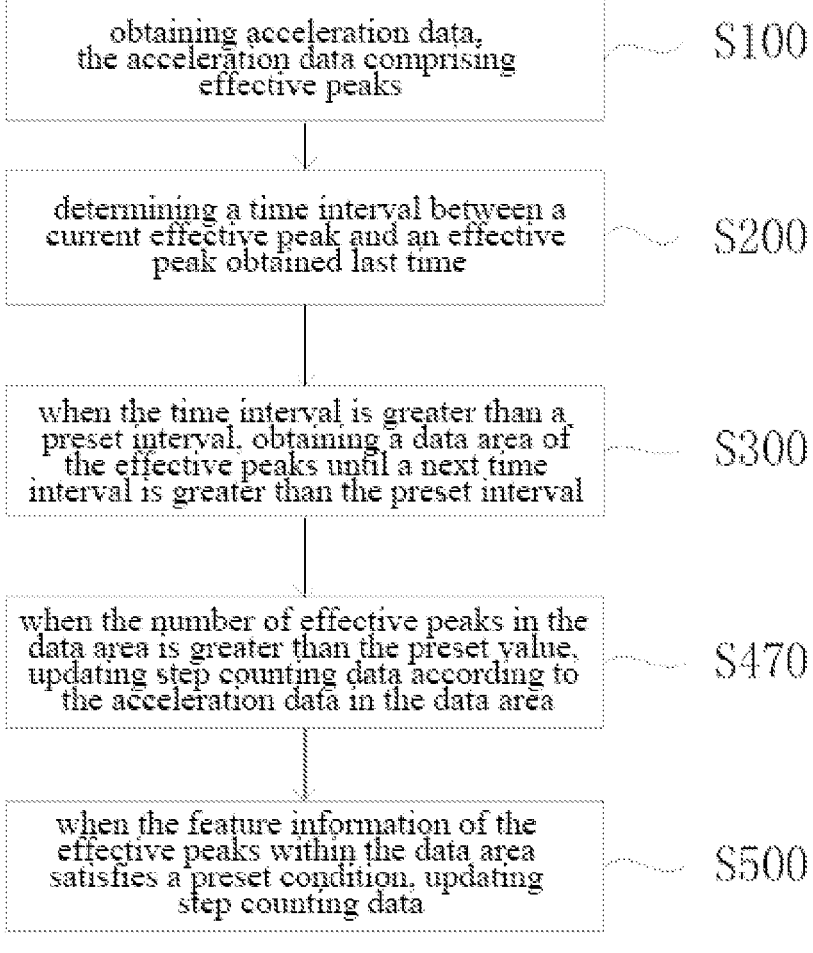

obtaining acceleration data,
the acceleration data comprising
effective peaks

S100 determining a time interval between a
current effective peak and an effective
peak obtained last time

S200 when the time interval is greater than a
preset interval, obtaining a data area of
the effective peaks until a next time
interval is greater than the preset interval

S300 when the number of effective peaks in the
data area is greater than the preset value,
updating step counting data according to
the acceleration data in the data area

S470 when the feature information of the
effective peaks within the data area
satisfies a preset condition, updating
step counting data

STEP COUNTING METHOD, STEP COUNTING DEVICE, AND COMPUTER READABLE STORAGE MEDIUM

This application claims the priority to Chinese Patent Application No. 202010757461.9, titled "STEP COUNTING METHOD, STEP COUNTING DEVICE, AND COMPUTER READABLE STORAGE MEDIUM", filed on Aug. 3, 2020, which is incorporated by reference as if fully set forth herein.

TECHNICAL FIELD

The present disclosure relates to the technical field of wearable devices, and in particular, to a step counting method, a step counting device, and a computer readable storage medium.

BACKGROUND ART

With the development of electronic devices, users are paying more and more attention to their daily sports. Step counting devices can record steps of walking or running in the daily activities of users, so as to provide the users with information on the number of moving steps, which is convenient for the users to determine the amount of exercise and energy consumption according to the information on the number of moving steps.

In the existing step counting methods, an acceleration sensor is generally used to collect acceleration data of the user while walking, and when effective peaks in the acceleration data reach a certain number, the user's walking steps are updated. However, in real life, users may stop and go during the walking process, and in this case, the effective peaks collected by the step counting device may not reach a predetermined number, thus in the process, the step counting device may still judge that the user has not walked, so that the step counting device cannot accurately record the number of walking steps of the user, resulting in low step counting accuracy of the step counting device.

The above is only used to assist the understanding of the technical solution of the present disclosure, and does not mean that the above is recognized as the prior art.

SUMMARY

The present disclosure provides a step counting method, a step counting device, and a computer readable storage medium, aiming at solving the problem in the prior art that step counting devices have low step counting accuracy.

In order to achieve the above object, the present disclosure provides a step counting method including:

obtaining acceleration data, the acceleration data including effective peaks;

determining a time interval between a current effective peak and an effective peak obtained last time;

when the time interval is greater than a preset interval, obtaining a data area of the effective peaks until a next time interval is greater than the preset interval;

when the number of effective peaks within the data area is less than a preset value, determining feature information of the effective peaks within the data area; and when the feature information of the effective peaks within the data area satisfies a preset condition, updating step counting data.

Optionally, after determining a time interval between a current effective peak and an effective peak obtained last time, the method further includes:

when the time interval is less than the preset interval, incrementing the number of consecutive times by one, and switching to a next effective peak.

Optionally, when the feature information of the effective peaks within the data area satisfies a preset condition, updating step counting data, includes:

when the feature information of the effective peaks within the data area satisfies a preset condition, determining the number of counted steps according to the effective peaks; and resetting the number of effective peaks in the data area to an initial value, and switching to a next effective peak.

Optionally, determining a time interval between a current effective peak and an effective peak obtained last time includes:

determining a characteristic value of a current effective peak and a characteristic time point corresponding to the characteristic value of the current effective peak; and when the characteristic value satisfies a first preset condition and the characteristic time point satisfies a second preset condition, determining a time interval between a current effective peak and an effective peak obtained last time according to the characteristic time point.

Optionally, when the number of effective peaks within the data area is less than a preset value, determining feature information of the effective peaks within the data area, includes:

when the number of effective peaks within the data area is less than a preset value, determining an amplitude of each effective peak and a time interval between adjacent effective peaks;

determining a first variance based on the amplitude and a second variance based on the time interval;

assessing the first variance and a first sub-preset range and the second variance and a second sub-preset range; and when the first variance is within the first sub-preset range and the second variance is within the second sub-preset range, updating step counting data according to the number of effective peaks in the data area and switching to a next effective peak, wherein the preset condition includes that the first variance is within the first sub-preset range and the second variance is within the second sub-preset range.

Optionally, when the effective peak is a first effective peak, the time interval is a time interval between a characteristic time point of the first effective peak and a reference time point.

Optionally, after when the time interval is greater than a preset interval, obtaining a data area of the effective peaks until a next time interval is greater than the preset interval, the method further includes:

when the number of effective peaks in the data area is greater than the preset value, updating step counting data according to the acceleration data in the data area.

In order to achieve the above object, the present disclosure provides a step counting device including a memory, a processor and a step counting program stored on the memory and executable on the processor, the step counting program, when executed by the processor, implementing the step counting method according to any one of the above embodiments.

In order to achieve the above object, the present disclosure provides a computer readable storage medium having a step counting program stored thereon, the step counting program, when executed by the processor, implementing the step counting method according to any one of the above embodiments.

The present disclosure provides a step counting method, a step counting device and a computer readable storage medium. The step counting method includes: obtaining acceleration data, the acceleration data including effective peaks; determining a time interval between a current effective peak and an effective peak obtained last time; when the time interval is greater than a preset interval, obtaining a data area of the effective peaks until a next time interval is greater than the preset interval; when the number of effective peaks within the data area is less than a preset value, determining feature information of the effective peaks within the data area; and when the feature information of the effective peaks within the data area satisfies a preset condition, updating step counting data. After the step counting device intermittently obtains the acceleration data, the acceleration data can be assessed, so as to assess the step counting data that does not meet the step counting condition, thereby improving the step counting accuracy of the step counting device, and solving the problem in the prior art that step counting devices cannot record the number of steps when the user moves for a short time, which leads to low step counting accuracy.

BRIEF DESCRIPTION OF THE DRAWINGS

In order to more clearly describe the technical solutions in the embodiments of the present disclosure or in the prior art, the following will briefly introduce the drawings required for the description of the embodiments or the prior art. Obviously, the drawings in the following description are only a part of drawings of the disclosure, and for persons of ordinary skill in the art, other drawings can also be obtained according to the provided drawings without any creative effort.

FIG. 2 is a flow chart of a step counting method according to a first embodiment of the present disclosure;

FIG. 4 is a flow chart of the step counting method according to a third embodiment of the present disclosure;

FIG. 5 is a flow chart of the step counting method according to a fourth embodiment of the present disclosure;

FIG. 6 is a flow chart of the step counting method according to a fifth embodiment of the present disclosure;

FIG. 7 is a flow chart of the step counting method according to a sixth embodiment of the present disclosure.

DETAILED DESCRIPTION OF THE EMBODIMENTS

The following will describe the technical solutions in the embodiments of the present disclosure in combination with the drawings in the embodiments of the present disclosure. Obviously, the described embodiments are only part of the embodiments of the present disclosure, rather than all the embodiments. Based on the embodiments according to the present disclosure, all other embodiments obtained by persons of ordinary skill in the art without creative efforts shall fall within the protection scope of the present disclosure.

Figure 1:
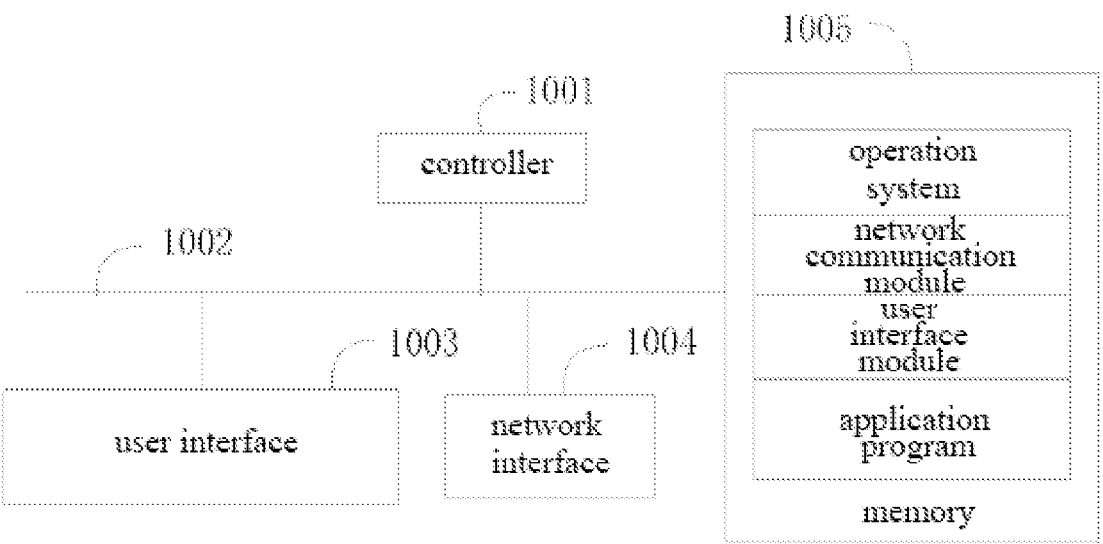
FIG. 1 is a structural schematic diagram of a terminal in hardware operating environment according to an embodiment of the present disclosure.

Referring to FIG. 1, FIG. 1 is a structural schematic diagram of a device in hardware operating environment according to an embodiment of the present disclosure.

As shown in FIG. 1, the device may include: a controller 1001 such as a CPU, a network interface 1004, a user interface 1003, a memory 1005, and a communication bus 1002. The communication bus 1002 is used to realize communication between these components. The user interface 1003 may include a display, an input unit such as a keyboard. Optionally, the user interface 1003 may include a standard wired interface or a wireless interface. The network interface 1004 may include a standard wired interface or a wireless interface such as a WI-FI interface. The memory 1005 may be a high-speed RAM memory, or a non-volatile memory such as a disk memory. The memory 1005 may be a storage device independent of the aforementioned controller 1001.

It will be understood by those skilled in the art that the structure of the device shown in FIG. 1 does not constitute a limitation on the device, and may include more or less components than shown in the figure, or may combine some components, or may have different arrangement of components.

As shown in FIG. 1, the memory 1005, which is a computer storage medium, may include an operation device, a network communication module, a user interface module, and an application program.

In the server shown in FIG. 1, the network interface 1004 is mainly used to be connected with a background server and perform data communication with the background server; the user interface 1003 is mainly used to be connected with a client (user-end) and perform data communication with the client; and the controller 1001 may be used to call an application program stored in the memory 1005 and perform the following operations:

obtaining acceleration data, the acceleration data including effective peaks;

determining a time interval between a current effective peak and an effective peak obtained last time;

when the time interval is greater than a preset interval, obtaining a data area of the effective peaks until a next time interval is greater than the preset interval;

when the number of effective peaks within the data area is less than a preset value, determining feature information of the effective peaks within the data area; and when the feature information of the effective peaks within the data area satisfies a preset condition, updating step counting data.

Further, the controller 1001 may call an application program stored in the memory 1005, and perform the following operations:

when the time interval is less than the preset interval, incrementing the number of consecutive times by one, and switching to a next effective peak.

Further, the controller 1001 may call an application program stored in the memory 1005, and perform the following operations:

when the feature information of the effective peaks within the data area satisfies a preset condition, determining the number of counted steps according to the effective peaks; and resetting the number of effective peaks in the data area to an initial value, and switching to a next effective peak.

Further, the controller 1001 may call an application program stored in the memory 1005, and perform the following operations:

> determining a characteristic value of a current effective peak and a characteristic time point corresponding to the characteristic value of the current effective peak; and
>
> when the characteristic value satisfies a first preset condition and the characteristic time point satisfies a second preset condition, determining a time interval between a current effective peak and an effective peak obtained last time according to the characteristic time point.

Further, the controller 1001 may call an application program stored in the memory 1005, and perform the following operations:

> when the number of effective peaks within the data area is less than a preset value, determining an amplitude of each effective peak and a time interval between adjacent effective peaks;
>
> determining a first variance based on the amplitude and a second variance based on the time interval;
>
> assessing the first variance and a first sub-preset range and the second variance and a second sub-preset range; and
>
> when the first variance is within the first sub-preset range and the second variance is within the second sub-preset range, updating step counting data according to the number of effective peaks in the data area and switching to a next effective peak, wherein the preset condition includes that the first variance is within the first sub-preset range and the second variance is within the second sub-preset range.

Further, the controller 1001 may call an application program stored in the memory 1005, and perform the following operations:

> when the number of effective peaks in the data area is greater than the preset value, updating step counting data according to the acceleration data in the data area.

The present disclosure provides a step counting method, a step counting device and a computer readable storage medium.

First Embodiment

Referring to FIG. 2, the method includes:

S100, obtaining acceleration data, the acceleration data including effective peaks.

Here, the step counting device includes an acceleration sensor, and the acceleration data is data collected by the acceleration sensor of the step counting device. Specifically, the acceleration data is waveform data that changes with time. When the user wears the step counting device to perform an action, the acceleration sensor receives a change of the acceleration caused by the user's movement, and represents it in the form of a waveform. During the user's movement, the user walks through an alternating swing of the left and right hands and a sequential movement of the left and right feet, and in the walking process, the acceleration data detected by the acceleration sensor changes periodically up and down, accordingly, the user's movement state can be determined according to the acceleration data. When the user performs other actions, a regular periodic change of the waveform cannot be maintained, so that the step counting device can determine the user's walking steps according to the change of waveform.

The method includes:

S200, obtaining a time interval between a current effective peak and an effective peak obtained last time.

Here, when it is determined that the acceleration data includes effective peaks, the continuity of the acceleration data may be determined according to the time interval between the current effective peak and the effective peak obtained last time. When the time interval between two adjacent effective peaks is greater than the preset interval, it means that the acceleration data is discontinuous data, so the effective peak obtained last time cannot be used to determine the current acceleration data. When the time interval between two adjacent effective peaks is less than or equal to the preset interval, it means that the user is in a state of continuous motion, so the step counting information of the user can be further determined according to the acceleration data.

The method includes:

S300, when the time interval is greater than a preset interval, obtaining a data area of the effective peaks until a next time interval is greater than the preset interval;

Here, when the time interval is greater than a preset interval, it means that a current motion state of the user has a lower motion frequency than an ordinary walking state. For example, when the use is jumping or moving irregularly, the time interval of the acceleration data recorded by the step counting device may be greater than the preset interval, and when a time interval obtained when the step counting device detects a next effective peak is greater than the preset interval, it is determined that the data area is data area for step counting.

The method includes:

S400, when the number of effective peaks within the data area is less than a preset value, determining feature information of the effective peaks within the data area; and Here, when the number of effective peaks within the data area is less than the preset value, it means that the number of steps of the user has not reached a default step counting condition of the step counting device, such that the acceleration data corresponding to the number of effective peaks in the data area determined by the step counting device may be determined, and feature information of each of the corresponding effective peaks is determined according to the acceleration data.

When the number of effective peaks within the data area is greater than or equal to the preset value, it means that the effective peaks in the saved acceleration data of the user have reached the preset value, and steps can be counted in sequence based on the acceleration data according to a normal working mode.

The method includes:

S500, when the feature information of the effective peaks within the data area satisfies a preset condition, updating step counting data.

Here, when it is determined that the number of effective peaks within the data area is less than the preset value, it is determined first the feature information of the effective peaks, which corresponds to the acceleration data corresponding to the number of the effective peaks within the data area. Specifically, the feature information includes a characteristic value of the effective peak and a time interval with the effective peak obtained last time. In a specific implementation, the characteristic value of the effective peak is an amplitude of the effective peak. When both the amplitude and the time interval satisfy the preset conditions of the step counting device, the step counting data is updated according to the effective peaks.

The present disclosure provides a step counting method, the step counting method includes: obtaining acceleration data, the acceleration data including effective peaks; determining a time interval between a current effective peak and an effective peak obtained last time; when the time interval is greater than a preset interval, obtaining a data area of the effective peaks until a next time interval is greater than the preset interval; when the number of effective peaks within the data area is less than a preset value, determining feature information of the effective peaks within the data area; and when the feature information of the effective peaks within the data area satisfies a preset condition, updating step counting data. After the step counting device intermittently obtains the acceleration data, the acceleration data can be assessed, so as to assess the step counting data that does not meet the step counting condition, thereby improving the step counting accuracy of the step counting device, and solving the problem in the prior art that step counting devices cannot record the number of steps when the user moves for a short time, which leads to low step counting accuracy.

Second Embodiment

Figure 3:
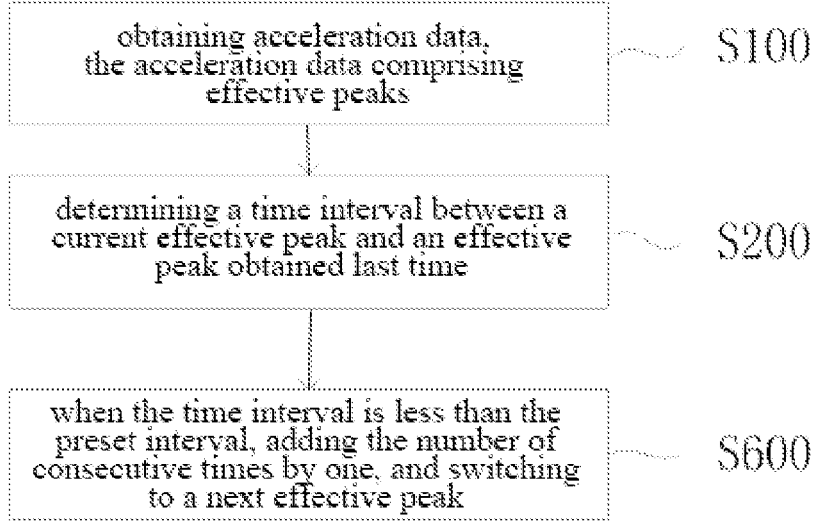
FIG. 3 is a flow chart of the step counting method according to a second embodiment of the present disclosure.

Referring to FIG. 3, after the step 200 in the first embodiment, the method further includes:

S600, when the time interval is less than the preset interval, incrementing the number of consecutive times by one, and switching to a next effective peak.

Here, when the time interval is less than the preset interval, it means that the user is currently in a state of continuous motion, so a current effective peak can be recorded, and the number of effective peaks in the data area is increased by one. Each time the time interval between one of the effective peaks and the effective peak obtained last time is less than the preset interval, the number of consecutive times is determined to be increased by one. When the time interval is greater than the preset interval, it means that the user has changed from the motion state to a static state, so the number of effective peaks in the data area updated by the step counting device may be determined, and the step counting state of the user in the acceleration data corresponding to the consecutive times is determined.

Third Embodiment

Referring to FIG. 4, the step 500 in the first embodiment includes:

S510, when the feature information of the effective peaks within the data area satisfies a preset condition, determining the number of counted steps according to the effective peaks; and S520, resetting the number of effective peaks in the data area to an initial value, and switching to a next effective peak.

Here, when the comparison of the effective peaks corresponding to the number of effective peaks in the data area with the preset condition is completed, it means that the acceleration data corresponding to the number of effective peaks in the data area has been processed. Accordingly, the number of effective peaks in the data area is needed to be reset to an initial value, which is convenient for processing the subsequent acceleration data. In a preferred embodiment, after determining the acceleration data associated with the number of effective peaks in the data area, the number of effective peaks in the data area is reset to 0.

After resetting the number of effective peaks in the data area to the initial value, the step counting device completes the update of the step counting data for the effective peaks corresponding to the number of effective peaks in the data area, and a next effective peak may be switched to, so as to perform step counting processing on the subsequent acceleration data.

In a specific embodiment, a default step counting starting value of the step counting device is 10, and step counting device may start a step counting operation and update the step counting data when it is detected that the number of steps of the user exceeds 10 steps. When the number of effective peaks detected by the step counting device is 8, which is less than 10, the 8 effective peaks are required to be compared with the preset condition respectively, and when 6 effective peaks among the 8 effective peaks satisfy the condition, step counting data of the step counting device is updated to increase the number of recorded steps by 6.

Fourth Embodiment

Referring to FIG. 5, the step 200 in the first embodiment includes:

S210, determining a characteristic value of a current effective peak and a characteristic time point corresponding to the characteristic value of the current effective peak; and S220, when the characteristic value satisfies a first preset condition and the characteristic time point satisfies a second preset condition, determining a time interval between a current effective peak and an effective peak obtained last time according to the characteristic time point.

Here, in order to determine the time interval between two adjacent effective peaks, it is necessary to first determine the characteristic values of the two effective peaks and the characteristic time points corresponding to the characteristic values. Specifically, the first preset condition is a preset threshold, the characteristic values of the two effective peaks are firstly compared with the preset threshold, when the characteristic values of the effective peaks are greater than or equal to the preset threshold, it means that the effective peaks can be used to update the step counting data, and after it is determined that the characteristic values of the effective peaks are greater than or equal to the preset threshold, the time interval between the two effective peaks is determined according to the characteristic time points corresponding to the characteristic values of the effective peaks.

In a specific embodiment, the acceleration data includes five effective peaks, and when comparing characteristic values of the five effective peaks and the preset threshold, it is determined that the first, the second, the third and the fifth characteristic values are greater than or equal to the preset threshold, and the fourth characteristic value is less than the preset threshold, such that when calculating the time interval, a time interval between the first effective peak and the second effective peak, a time interval between the second effective peak and the third effective peak, and a time interval between the third effective peak and the fifth effective peak are calculated respectively, and a time interval between the third effective peak and the fourth effective peak and a time interval between the fourth effective peak and the fifth effective peak are not calculated.

Fifth Embodiment

Referring to FIG. 6, the step 400 in the first embodiment includes:

S410, when the number of effective peaks within the data area is less than a preset value, determining an amplitude of each effective peak and a time interval between adjacent effective peaks;

S420, determining a first variance based on the amplitude and a second variance based on the time interval;

S430, assessing the first variance and a first sub-preset range and the second variance and a second sub-preset range; and S440, when the first variance is within the first sub-preset range and the second variance is within the second sub-preset range, updating step counting data according to the number of effective peaks in the data area and switching to a next effective peak, wherein the preset condition includes that the first variance is within the first sub-preset range and the second variance is within the second sub-preset range.

Here, the feature information includes an amplitude of the current effective peak and a time interval between the current effective peak and the effective peak obtained last time; the preset condition includes a first sub-preset range and a second sub-preset range, after determining the amplitude corresponding to the effective peak and the time interval with the effective peak obtained last time, a first variance of a plurality of the effective peaks is determined, and after determining a second variance according to a plurality of the time intervals, it is determined whether the first variance is within the first sub-preset range and whether the second variance is within the second sub-preset range.

In a specific embodiment, the acceleration data includes five effective peaks, and the five effective peaks are respectively 0.9316, 1.3542, 0.924, 1.1373, and 0.9559; the time intervals between adjacent two of the five effective peaks respectively have 26, 27, 27, and 29 sample points; the calculated first variance is 0.1858, and the second variance is 1.2583. When the first sub-preset range is 0.4, the second sub-preset range is 2.25, the first variance is less than the first sub-preset range, and the second variance is less than the second sub-preset range. Therefore, the five effective peaks in the acceleration data can all update the step counting data set.

In an optional implementation, when the effective peak is a first effective peak, the time interval is a time interval between a characteristic time point of the effective peak and a reference time point. Specifically, for the first effective peak in a plurality of the effective peaks, since there is no effective peak before the first effective peak, the characteristic time point of the first effective peak and the reference time point are calculated to determine the time interval between the characteristic time point and the reference time point, so as to facilitate the determination of the first effective peak.

In an optional implementation, when any one of the first variances is not within the first sub-preset range, it means that the effective peak corresponding to the first variance does not meet the step counting requirement, so a next effective peak is switched to; when any one of the second variances is not within the second sub-preset range, it means that the effective peak corresponding to the second variance does not meet the step counting requirement, so a next effective peak is switched to.

Sixth Embodiment

Referring to FIG. 7, after the step 400 in the first embodiment, the method further includes:

S470, when the number of effective peaks in the data area is greater than the preset value, performing step counting operation on the acceleration data corresponding to the number of the effective peaks in the data area, and resetting the number of the effective peaks in the data area to the initial value.

Here, when the number of effective peaks in the data area is greater than the preset value, it means that the step counting device can continue to detect the acceleration data in a normal mode, and update the data according to the acceleration data. After the step counting data is updated by the acceleration data, the number of the effective peaks in the data area is reset to the initial value, so as to facilitate the determination of the subsequent acceleration data.

In order to achieve the above object, the present disclosure provides a step counting device, the step counting device includes a memory, a processor and a step counting program stored on the memory and executable on the processor, wherein when the step counting program is executed by the processor, the step counting method according to any one of the above embodiments is implemented.

In order to achieve the above object, the present disclosure further provides a computer readable storage medium, wherein a step counting program is stored on the computer readable storage medium, and wherein when the step counting program is executed by the processor, the step counting method according to any one of the above embodiments is implemented.

In some optional implementations, the processor may be a central processing unit (CPU) or other general-purpose processors, a digital signal processor (DSP), an application specific integrated circuits (ASIC), a field-programmable gate array (FPGA) or other programmable logic devices, discrete gate or transistor logic devices, discrete hardware components, etc. The general-purpose processor may be a microprocessor or any conventional processors.

The memory may be an internal storage unit of the device, such as a hard disk or a memory of the device. The memory may also be an external storage device of the device, such as a plug-in hard disk equipped on the device, a smart media card (SMC), a secure digital (SD) card, a flash card, etc. Further, the memory may include both an internal storage unit of the device and an external storage device. The memory is used to store computer programs and other programs and data required by the device. The memory may also be used to temporarily store data that has been output or is to be output.

Those skilled in the art can clearly understand that, for the convenience and simplicity of description, the above-mentioned functional units and modules are illustrated by way of example. In practical applications, the above functions can be allocated to different functional units and modules according to the need, that is, the internal structure of the device can be divided into different functional units or modules to complete all or part of the functions described above. The functional units and modules in the embodiment may be integrated in one processing unit, or the units may be provided independently, or two or more units may be integrated in one unit, and the above-mentioned integrated units may be implemented in the form of hardware, or may be implemented in the form of software functional units. In addition, specific names of the functional units and modules are only for the convenience of distinguishing from each other, and are not intended to limit the protection scope of the present disclosure. For the specific operating processes of the units and modules in the above-mentioned system, reference may be made to the corresponding processes in the foregoing method embodiments, which will not be repeated here.

The above are only preferred embodiments of the present disclosure, and are not intended to limit the protection scope of the present disclosure. Equivalent structural transformations made by using the contents of the description and drawings of the present disclosure, or direct/indirect applications in other related technical fields, without departing from the concept of the disclosure, are included in the protection scope of the present disclosure.

The various embodiments in this specification are described in a parallel or progressive manner, and each embodiment focuses on the differences from other embodiments, and the same or similar parts between the various embodiments may be referred to each other. As for the device disclosed in the embodiment, since it corresponds to the method disclosed in the embodiment, the description is relatively simple. For relevant parts, please refer to the description of the method.

Those of ordinary skill in the art will understand that the units and algorithm steps of each example described in conjunction with the embodiments disclosed herein can be implemented by electronic hardware, computer software, or a combination thereof. In order to clearly explain the interchangeability of hardware and software, the composition and steps of each example have been generally described in the above description in terms of function. Whether these functions are performed in hardware or software depends on the specific application and design constraints of the embodiment. Those skilled in the art may implement the described functions for each specific application using different methods, but such implementations should not be considered beyond the scope of the present application.

The steps of the method or algorithm described in connection with the embodiments disclosed herein may be directly implemented by hardware, a software module executed by a processor, or a combination thereof. The software module may be disposed in a random access memory (RAM), a memory, a read only memory (ROM), an electrically programmable ROM, an electrically erasable programmable ROM, a register, a hard disk, a removable disk, a CD-ROM, or any other form of storage medium known in the art.

It should be noted that relational terms such as first and second described herein are only used to distinguish one entity or operation from another entity or operation, and do not necessarily require or imply any such actual relationship or order between these entities or operations. Moreover, terms such as "comprise", "include" or any other variation thereof are intended to encompass a non-exclusive inclusion such that a process, method, article or apparatus that includes a series of elements includes not only those elements, but also other elements not explicitly listed, or elements inherent to such a process, method, article or apparatus. Without further limitation, the element defined by the phrase "comprising a . . . " does not preclude the presence of additional identical elements in the process, method, article or apparatus including the element.

What is claimed is:

1. A step counting method performed by a controller, the step counting method comprising:
   obtaining acceleration data caused by a user's movement by an acceleration sensor of a step counting device, the acceleration data comprising a plurality of effective peaks;
   the step counting device determining a time interval between a current effective peak and a last effective peak, for determining continuity of the acceleration data;
   when the time interval is greater than a preset interval, the acceleration data is discontinuous data, obtaining the acceleration data as a data area of the effective peaks, and determining a number of the effective peaks within the data area, until a next time interval is greater than the preset interval by the step counting device;
   when the time interval is less than the preset interval, the user is currently in a state of continuous motion, the number of the effective peaks within the data area is increased by one, and switching to a next effective peak by the step counting device;
   when the number of the effective peaks within the data area is less than a preset value, determining feature information of the effective peaks within the data area by the step counting device,
   wherein the number of the effective peaks comprises a number of steps of the user that has not reached a default step counting condition of the step counting device; and
   when the feature information of the effective peaks within the data area satisfies a preset condition, updating step counting data by the step counting device.

2. The step counting method of claim 1, wherein when the feature information of the effective peaks within the data area satisfies the preset condition, the updating step counting data comprises:
   when the feature information of the effective peaks within the data area satisfies the preset condition, determining a number of counted steps according to the effective peaks by the step counting device; and
   resetting the number of the effective peaks in the data area to an initial value and switching to a next effective peak by the step counting device.

3. The step counting method of claim 1, wherein the determining the time interval between the current effective peak and the last effective peak comprises:
   determining a characteristic value of the current effective peak and a characteristic time point corresponding to the characteristic value of the current effective peak by the step counting device; and
   when the characteristic value satisfies a first preset condition and the characteristic time point satisfies a second preset condition, determining a time interval between the current effective peak and the last effective peak according to the characteristic time point by the step counting device.

4. The step counting method of claim 1, wherein when the number of the effective peaks within the data area is less than the preset value, the determining feature information of the effective peaks within the data area comprises:
   when the number of the effective peaks within the data area is less than the preset value, determining an amplitude of each effective peak and a time interval between adjacent effective peaks by the step counting device;

determining a first variance based on the amplitude and a second variance based on the time interval by the step counting device;

assessing the first variance, and a first sub-preset range, and assessing the second variance and a second sub-preset range by the step counting device; and when the first variance is within the first sub-preset range and the second variance is within the second sub-preset range, updating the step counting data according to a number of the effective peaks in the data area and switching to a next effective peak by the step counting device, wherein the preset condition comprises that the first variance is within the first sub-preset range and the second variance is within the second sub-preset range.

5. The step counting method of claim 4, wherein when the effective peak is a first effective peak, the time interval is a time interval between a characteristic time point of the first effective peak and a reference time point.

6. The step counting method of claim 1, wherein after when the time interval is greater than the preset interval, obtaining the data area of the effective peaks until the next time interval is greater than the preset interval, the method further comprises:

when a number of the effective peaks in the data area is greater than the preset value, the step counting device is configured to continue to detect the acceleration data in a normal mode, and updating the step counting data according to the acceleration data in the data area by the step counting device.

7. A step counting device, wherein the step counting device comprises a memory, a processor and a step counting program stored on the memory and executable on the processor, the step counting program, when executed by the processor, implementing the step counting method of claim 1.

8. A computer readable storage medium having a step counting program stored thereon, the step counting program, when executed by the processor, implementing the step counting method of claim 1.

* * * * *